United States Patent
Savoy et al.

(10) Patent No.: US 10,550,494 B2
(45) Date of Patent: *Feb. 4, 2020

(54) METHOD FOR ASSEMBLY OF ANALYTE FILTER ARRAYS USING BIOMOLECULES

(71) Applicants: Steve M. Savoy, Austin, TX (US); Daniel R. Mitchell, Austin, TX (US); Jeremy J. John, Austin, TX (US); George L. Murphy, Austin, TX (US)

(72) Inventors: Steve M. Savoy, Austin, TX (US); Daniel R. Mitchell, Austin, TX (US); Jeremy J. John, Austin, TX (US); George L. Murphy, Austin, TX (US)

(73) Assignee: NANOHMICS, INC., Austin, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/791,403

(22) Filed: Oct. 23, 2017

(65) Prior Publication Data
US 2018/0051390 A1   Feb. 22, 2018

Related U.S. Application Data

(62) Division of application No. 13/070,077, filed on Mar. 23, 2011, now Pat. No. 9,828,696.

(51) Int. Cl.
*C40B 50/18* (2006.01)
*B01J 19/00* (2006.01)

(52) U.S. Cl.
CPC ........... *C40B 50/18* (2013.01); *B01J 19/0046* (2013.01); *B01J 2219/00382* (2013.01);
(Continued)

(58) Field of Classification Search
CPC .......... B01J 19/0046; B01J 2219/00382; B01J 2219/00576; B01J 2219/00637; B01J 2219/00648; B01J 2219/00722
See application file for complete search history.

(56) References Cited

U.S. PATENT DOCUMENTS 3,971,065 A   7/1976   Bayer
4,542,640 A   9/1985   Clifford
(Continued)

FOREIGN PATENT DOCUMENTS

WO   0032044 A1   6/2000
WO   0100876 A1   1/2001
(Continued)

OTHER PUBLICATIONS

Acharya et al, "Rapid Detection of S-Adenosyl Homocysteine Using Self-Assembled Optical Diffraction Gratings", Angewandte Chemie Int Ed, vol. 47, No. 6, pp. 1051-1053, (Dec. 28, 2007).
(Continued)

*Primary Examiner* — Joseph G. Dauner
(74) *Attorney, Agent, or Firm* — George L. Murphy; Murphy Strategic IP

(57) ABSTRACT

Analyte filter arrays and methods for making an analyte filter array are provided. The arrays are formed using a dispersion of filter particles having selected moieties attached to the surface of the particles and a microarray having complementary moieties formed in an array on a substrate, such that each filter particle is attached to a selected region of the microarray. The moiety on the substrate may be RNA or DNA or other molecule. The substrate may be a surface of a detector array, a membrane that may be placed in registration with the detector array or a stamp used to transfer the filter array to a detector array.

21 Claims, 8 Drawing Sheets

(52) U.S. Cl.
CPC ............... *B01J 2219/00576* (2013.01); *B01J 2219/00637* (2013.01); *B01J 2219/00648* (2013.01); *B01J 2219/00722* (2013.01)

(56) References Cited

U.S. PATENT DOCUMENTS

| | | | |
|---|---|---|---|
| 5,051,391 | A | 9/1991 | Tomisawa et al. |
| 5,106,756 | A | 4/1992 | Zaromb |
| 5,411,709 | A | 5/1995 | Furuki et al. |
| 5,694,932 | A | 12/1997 | Michel |
| 5,807,701 | A | 9/1998 | Payne et al. |
| 5,837,832 | A | 11/1998 | Chee et al. |
| 5,936,730 | A | 8/1999 | Foley et al. |
| 6,028,331 | A | 2/2000 | Mastromatteo et al. |
| 6,238,869 | B1 | 5/2001 | Kris et al. |
| 6,268,222 | B1 | 7/2001 | Chandler et al. |
| 6,326,108 | B2 | 12/2001 | Simons |
| 6,327,410 | B1 | 12/2001 | Walt et al. |
| 6,361,944 | B1 | 3/2002 | Mirkin et al. |
| 6,391,562 | B2 | 5/2002 | Kambara et al. |
| 6,426,184 | B1 | 7/2002 | Gao et al. |
| 6,432,360 | B1 | 8/2002 | Church |
| 6,479,297 | B1 | 11/2002 | Sandhu |
| 6,567,163 | B1 | 5/2003 | Sandstrom |
| 6,620,584 | B1 | 9/2003 | Chee et al. |
| 6,649,403 | B1 | 11/2003 | McDevitt et al. |
| 6,689,321 | B2 | 2/2004 | Sandhu |
| 6,787,308 | B2 | 9/2004 | Balasubramanian et al. |
| 6,833,601 | B2 | 12/2004 | Murakami |
| 6,849,168 | B2 | 2/2005 | Crumly et al. |
| 6,849,239 | B2 | 2/2005 | Morris |
| 7,034,941 | B2 | 4/2006 | Chen et al. |
| 7,118,900 | B2 | 10/2006 | Seul et al. |
| 7,167,309 | B2 | 1/2007 | Saxena et al. |
| 7,182,916 | B2 | 2/2007 | Noda et al. |
| 7,211,654 | B2 | 5/2007 | Gao et al. |
| 7,297,497 | B2 | 11/2007 | Montagu et al. |
| 7,321,143 | B2 | 1/2008 | Kunath et al. |
| 7,335,153 | B2 | 2/2008 | Seul et al. |
| 7,335,942 | B2 | 2/2008 | Edinger et al. |
| 7,460,958 | B2 | 12/2008 | Walsh et al. |
| 7,489,017 | B2 | 2/2009 | Patel et al. |
| 7,491,680 | B2 | 2/2009 | Gao et al. |
| 7,553,958 | B2 | 6/2009 | Gao et al. |
| 7,786,530 | B2 | 8/2010 | Kakoschke et al. |
| 7,838,466 | B2 | 11/2010 | Gao et al. |
| 7,859,029 | B2 | 12/2010 | Lee et al. |
| 8,450,131 | B2 | 5/2013 | Savoy et al. |
| 9,252,175 | B2 | 2/2016 | Savoy et al. |
| 9,768,162 | B2 | 9/2017 | Savoy et al. |
| 9,828,696 | B2 | 11/2017 | Savoy et al. |
| 2001/0029049 | A1 | 10/2001 | Walt et al. |
| 2002/0018199 | A1 | 2/2002 | Blumenfeld et al. |
| 2002/0028455 | A1 | 3/2002 | Laibinis et al. |
| 2002/0045272 | A1 | 4/2002 | McDevitt et al. |
| 2002/0146745 | A1 | 10/2002 | Natan et al. |
| 2003/0040129 | A1 | 2/2003 | Shah |
| 2003/0118595 | A1 | 6/2003 | Niemeyer et al. |
| 2004/0038307 | A1 | 2/2004 | Lee et al. |
| 2004/0072274 | A1 | 4/2004 | Lebrun et al. |
| 2004/0121339 | A1 | 6/2004 | Zhou et al. |
| 2004/0248144 | A1 | 12/2004 | Mir |
| 2005/0032060 | A1 | 2/2005 | Shah et al. |
| 2005/0053949 | A1 | 3/2005 | Silin |
| 2005/0095649 | A1 | 5/2005 | Aebersold et al. |
| 2005/0130174 | A1 | 6/2005 | Bao et al. |
| 2005/0142567 | A1 | 6/2005 | Su et al. |
| 2006/0035229 | A1 | 2/2006 | Scharnweber et al. |
| 2006/0068504 | A1 | 3/2006 | Kogi |
| 2006/0252070 | A1 | 11/2006 | Boege et al. |
| 2007/0015213 | A1 | 1/2007 | Mutz et al. |
| 2007/0224616 | A1 | 9/2007 | Gulari et al. |
| 2007/0263914 | A1 | 11/2007 | Tibbetts |
| 2008/0146459 | A1 | 6/2008 | Iwakura et al. |
| 2008/0160316 | A1 | 7/2008 | Samson et al. |
| 2008/0241951 | A1 | 10/2008 | Battulga et al. |
| 2008/0293591 | A1 | 11/2008 | Taussig et al. |
| 2008/0312105 | A1 | 12/2008 | Bacher et al. |
| 2009/0018027 | A1 | 1/2009 | Ronald et al. |
| 2009/0036324 | A1 | 2/2009 | Fan et al. |
| 2009/0086064 | A1 | 4/2009 | Mackey |
| 2009/0101996 | A1 | 4/2009 | Bradley et al. |
| 2009/0153864 | A1 | 6/2009 | Kim et al. |
| 2009/0156427 | A1 | 6/2009 | Zhang et al. |
| 2009/0211437 | A1 | 8/2009 | Fleischer et al. |
| 2010/0009868 | A1 | 1/2010 | Yan et al. |
| 2012/0178199 | A1 | 7/2012 | Savoy et al. |
| 2012/0241590 | A1 | 9/2012 | Savoy et al. |
| 2013/0193405 | A1 | 8/2013 | Savoy et al. |

FOREIGN PATENT DOCUMENTS

| | | |
|---|---|---|
| WO | 02103371 A2 | 12/2002 |
| WO | 03079401 A2 | 9/2003 |
| WO | 03095469 A1 | 11/2003 |
| WO | 03102546 A2 | 12/2003 |
| WO | 2005030978 A2 | 4/2005 |
| WO | 2005103718 A1 | 11/2005 |
| WO | 2006116726 A2 | 11/2006 |
| WO | 2006124089 A1 | 11/2006 |
| WO | 2007139849 A2 | 12/2007 |
| WO | 2008027571 A2 | 3/2008 |
| WO | 2008033848 A2 | 3/2008 |
| WO | 2008082713 A2 | 7/2008 |

OTHER PUBLICATIONS

Arrieta et al, "Voltammetric sensor array based on conducting polymer-modified electrodes for the discrimination of liquids", Electrochimica Acta vol. 49, pp. 4543-4551, (Jun. 9, 2004).

Alberti et al, "Biomolecular self-assembly of micrometer sized silica beads on patterned glass substrates", Applied Surface Science, vol. 225, pp. 7759-7765, (May 3, 2009).

Alivisatos et al, "Organization of 'nanocrystal molecules' using DNA", Nature, vol. 382, pp. 609-611, (Aug. 15, 1996).

Bashir, "DNA Nanobiostructures", Materials Today, vol. Nov.-Dec. 2001, pp. 30-39, (2001).

Chhabra et al, "Spatially Addressable Multiprotein Nanoarrays Templated by Aptamer-Tagged DNA Nanoarchitectures", J. Am. Chem. Soc., vol. 129, pp. 10304-10305, (Aug. 4, 2007).

Csaki et al, "DNA monolayer on gold substrates characterized by nanoparticle labeling and scanning force microscopy", Nucl Acids Res, vol. 29(16), pp. e81 1-e81 5, (2001).

Dandy et al, "Array feature size influences nucleic acid surface capture in DNA microarrays", PNAS, vol. 104(20). pp. 8223-8228, (May 15, 2007).

Edelstein et al, "The BARC biosensor applied to the detection of biological warfare agents", Biosensors & Bioelectronics, vol. 14, pp. 805-813, (2000).

Hassibi et al, "A Programmable 0.18-um CMOS Electrochemical Sensor Microarray for Biomolecular Detection", IEEE Sensors J, vol. 6, No. 6, pp. 1380-1388, (Dec. 2006).

Huie, "Guided molecular self-assembly: a review of recent efforts", Smart Mater. Struct., vol. 12, pp. 264-271, (Mar. 27, 2003).

Ivanov et al, "Antibodies Immobilized as Arrays to Profile Protein Post-translational Modifications in Mammalian Cells", Molec. Cell. Proteomics, vol. 3.8, pp. 788-795, (May 3, 2004).

Kanan et al, "Semiconducting Metal Oxide Based Sensors for Selective Gas Pollutant Detection", Sensors, vol. 9, pp. 8158-8196, (Oct. 16, 2009).

Korotcenkov, "Metal oxides for solid-state gas sensors: What determines our choice?", Mater Sci Engineering B, vol. 139, pp. 1-23, (2007).

Kozak et al, "Improving the Signal-to-Noise Performance of Molecular Diagnostics with PEG-Lysine Copolymer Dendrons", Biomacromolecules, vol. 10(2), pp. 360-365, (Jan. 21, 2009).

McCauley et al, "Aptamer-based biosensor arrays for detection and quantification of biological macromolecules", Anal. Biochem., vol. 319, pp. 244-250, (2003).

(56) References Cited

OTHER PUBLICATIONS

McNally et al, Self-assembly of micro- and nano-scale particles using bio-inspired events, Appl. Surf. Sci., vol. 214, pp. 109-119, (2003).

Niemeyer et al, "Combination of DNA-directed immobilization and immuno-PCR: very sensitive antigen detection by means of self-assembled DNA-protein conjugates", Nucl. Acids Res., vol. 31(16), pp. e90 1-e90 7, (2003).

Oleinikov et al, "Self-Assembling Protein Arrays Using Electronic Semiconductor Microchips and in Vitro Translation", J Proteome Res, vol. 2, pp. 313-319, (Apr. 5, 2003).

Park et al, "Array-Based Electrical Detection of DNA with Nanoparticle Probes", Science, vol. 295, pp. 1503-1506, (Feb. 22, 2002).

Platt et al, "Aptamer evolution for array-based diagnostics", Anal. Biochem., vol. 390, pp. 203-205, (Apr. 15, 2009).

Pouthas et al, "DNA Detection on Transistor Arrays Following Mutation-Specific Enzymatic Amplification", Appl Phys Lett, vol. 84, No. 9, pp. 1594-1596, (Mar. 1, 2004).

Stadler et al, "Multifunctional CMOS Microchip Coatings for Protein and Peptide Arrays", J. Proteome Res., vol. 6, pp. 3197-3202, (Jul. 12, 2007).

Schroder et al, "Addressable Microfluidic Polymer Chip for DNA-Directed Immobilization of Oligonucleotide-Tagged Compounds", Small Jour., vol. 5(13), pp. 1547-1552, (Mar. 26, 2009).

PCT International Searching Authority; International Search Report and Written Opinion of the International Searching Authority issued in PCT Application PCT/US2012/030133, dated Jul. 18, 2012, pp. 1-14.

Kang et al, "Multi-WO3 nanowire based gas detector", J. Vac. Sci. Technol. B, vol. 27, No. 3, pp. 204-206, (May 22, 2009).

Jiang et al, "Au nanoparticles-functionalized two-dimensional patterned conducting PANI nanobowl monolayer for gas sensor", Sensors and Actuators B 140, 2009, pp. 520-524, (May 7, 2009).

Abdullah et al, "Potassium Ion-Selective Field-Effect Transistor Device Response in Mixed-Ion Solutions", Nanoscience and Nanotechnology, International Conference on Nanoscience and Nanotechnology, (NANO-Sci-Tech 2008), (eds) Rusop and Soga, pp. 540-544.

Barash et al, "Sniffing the Unique "Odor Print" of Non-Small-Cell Lung Cancer with Gold Nanoparticles", small 2009, vol. 5, No. 22, pp. 2618-2624, (Aug. 24, 2009).

Vijayalakshmi, et al, "Enzyme field effect transistor (ENFET) for estimation of triglycerides using magnetic nanoparticles", Biosensors and Bioelectronics vol. 23 (2008), pp. 1708-1714, (Feb. 13, 2008).

Lindner et al, "Quality control criteria for solid-contact, solvent polymeric membrane ion-selective electrodes", J Solid State Electrochem, vol. 13, pp. 51-68, (Aug. 3, 2008).

Zehfroosh et al., "High-Sensitivity Ion-Selective Field-Effect Transistors Using Nanoporous Silicon", IEEE Electron Device Letters, vol. 31, No. 9, pp. 1056-1058, (Jul. 23, 2010).

Nikfarjam et al, "Fabrication of gas ionization sensor using carbon nanotube arrays grown on porous silicon substrate", Sensors and Actuators A 162 (2010), pp. 24-28, (Jun. 17, 2010).

Wang et al, "Carbon Nanotube/Polythiophene Chemiresistive Sensors for Chemical Warfare Agents", J. Am. Chem. Soc. 2008, vol. 130, pp. 5392-5393 (Mar. 29, 2008).

Wakida et al, "Highly Sensitive Nitrate-Sensing Materials for Ion-Selective Field-Effect Transistors for Single-Drop Rain Analysis", Sensors and Materials, vol. 19, No. 4, pp. 235-247, (2007).

Fortunato et al, "Multifunctional Thin Film Zinc Oxide Semiconductors: Application to Electronic Devices", Materials Science Forum, ISSN: 1662-9752, vols. 514-516, pp. 3-7, (May 15, 2006).

Voronov et al, "Elements of gas sensitive detectors based on microtechnologies", Abstract, Sensors and Systems Journal, No. 3, (Mar. 2010), Abstract at p. 2 of attached document titled "Voronov".

Office Action issued in U.S. Appl. No. 13/070,077, dated Jun. 5, 2012.

Office Action issued in U.S. Appl. No. 13/070,077, dated Aug. 7, 2012.

Office Action issued in U.S. Appl. No. 13/070,077, dated Dec. 26, 2012.

Office Action issued in U.S. Appl. No. 13/070,077, dated Feb. 7, 2013.

Office Action issued in U.S. Appl. No. 13/070,077, dated Apr. 4, 2013.

Office Action issued in U.S. Appl. No. 13/070,077, dated Apr. 23, 2014.

Office Action issued in U.S. Appl. No. 13/070,077, dated Nov. 6, 2014.

Office Action issued in U.S. Appl. No. 13/070,077, dated Mar. 19, 2015.

Examiner's Answer to Appeal Brief issued in U.S. Appl. No. 13/070,077, dated Oct. 20, 2015.

Patent Board Decision issued in U.S. Appl. No. 13/070,077, dated May 12, 2017.

Notice of Allowance issued in U.S. Appl. No. 13/070,077, dated Jul. 24, 2017.

Office Action issued in U.S. Appl. No. 13/069,928, dated May 14, 2014.

Office Action issued in U.S. Appl. No. 13/069,928, dated Aug. 22, 2014.

Terminal Disclaimer filed in U.S. Appl. No. 13/069,928, dated Feb. 20, 2015.

Terminal Disclaimer decision in U.S. Appl. No. 13/069,928, dated Feb. 27, 2015.

Office Action issued in U.S. Appl. No. 13/069,928, dated May 21, 2015.

Notice of Allowance issued in U.S. Appl. No. 13/069,928, dated Sep. 29, 2015.

Issue Notification n U.S. Appl. No. 13/069,928, dated Jan. 13, 2016.

Office Action issued in U.S. Appl. No. 13/788,464, dated Jul. 30, 2014.

Office Action issued in U.S. Appl. No. 13/788,464, dated Mar. 25, 2015.

Office Action issued in U.S. Appl. No. 13/788,464, dated Jul. 10, 2015.

Office Action issued in U.S. Appl. No. 13/788,464, dated Sep. 29, 2015.

Office Action issued in U.S. Appl. No. 13/788,464, dated Mar. 29, 2016.

Office Action issued in U.S. Appl. No. 13/788,464, dated Oct. 6, 2016.

Notice of Allowance issued in U.S. Appl. No. 13/788,464, dated May 26, 2017.

Issue Notice in U.S. Appl. No. 13/788,464, dated Aug. 30, 2017.

Office Action issued in U.S. Appl. No. 13/004,381, dated Nov. 18, 2011.

Office Action issued in U.S. Appl. No. 13/004,381, dated Sep. 6, 2012.

Notice of Allowance issued in U.S. Appl. No. 13/004,381, dated Mar. 4, 2013.

Issue Notice in U.S. Appl. No. 13/004,381, dated May 8, 2013.

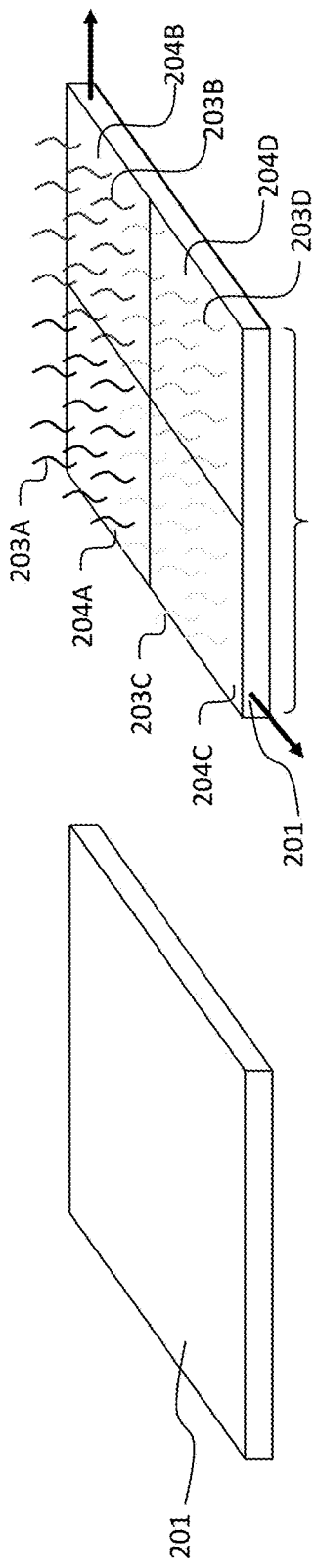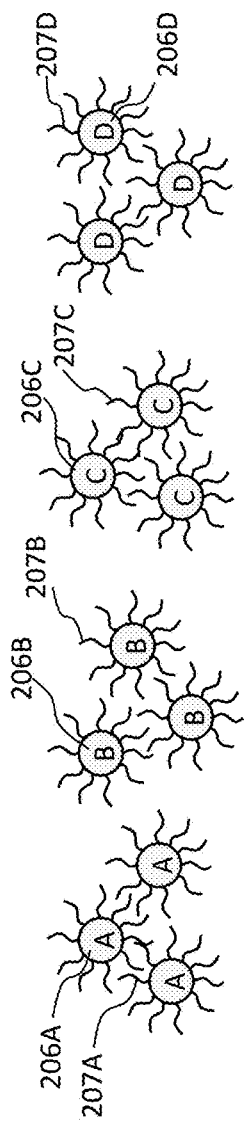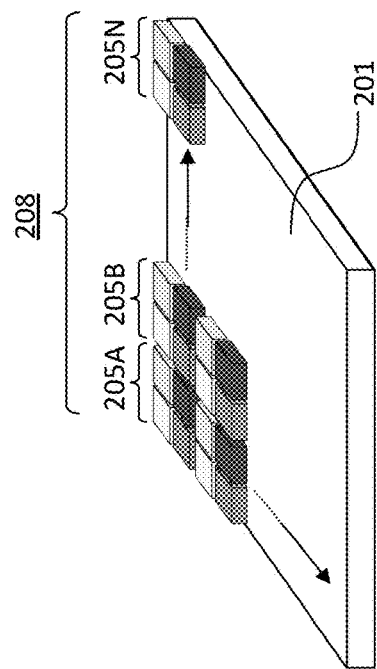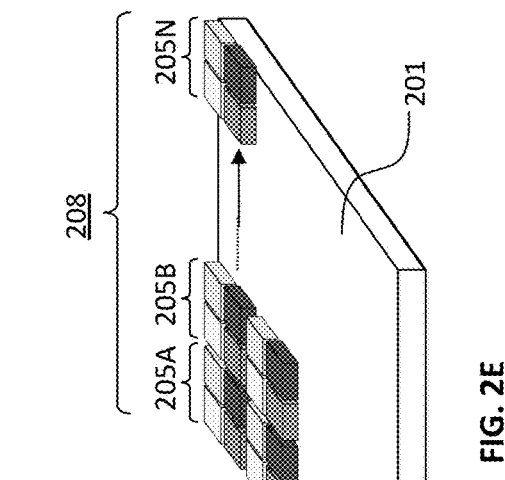

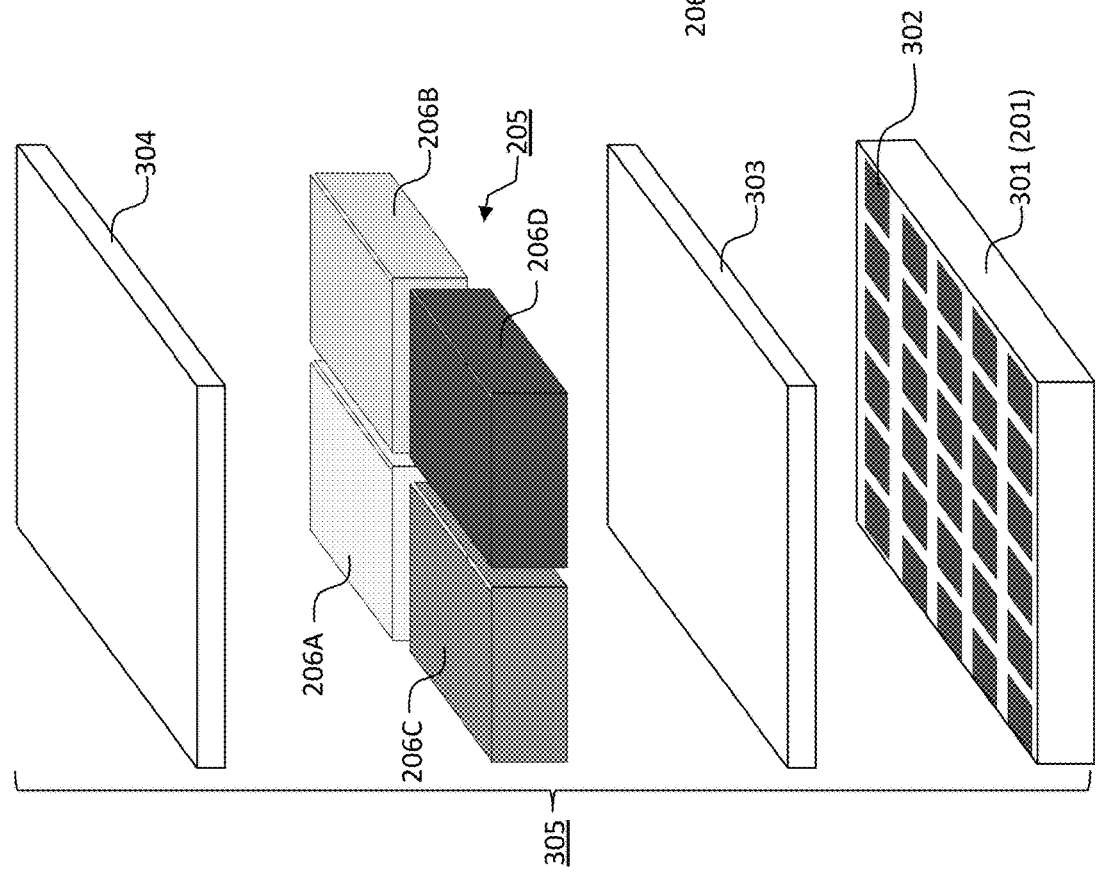
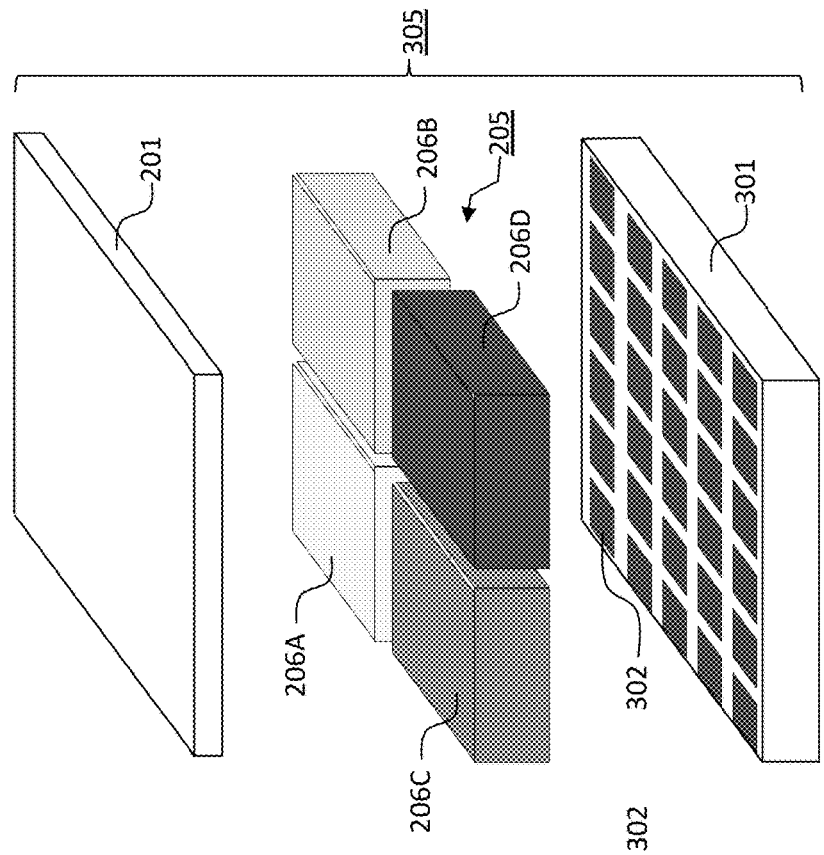
FIG. 3A
FIG. 3B

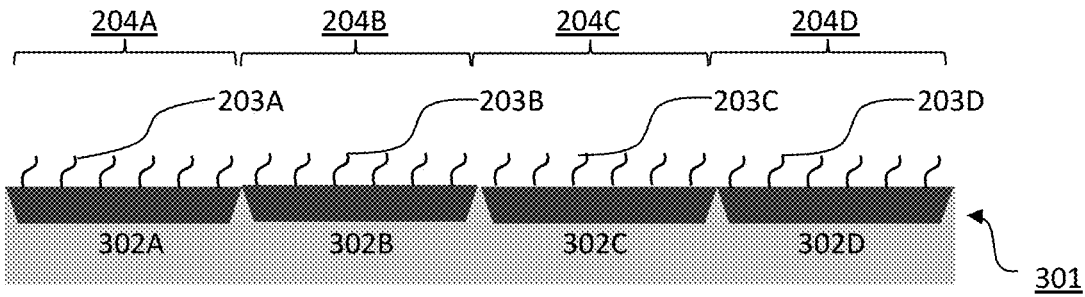
FIG. 4A
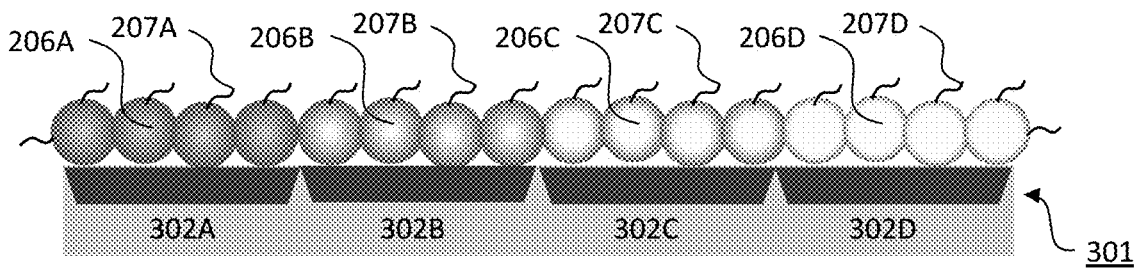
FIG. 4B
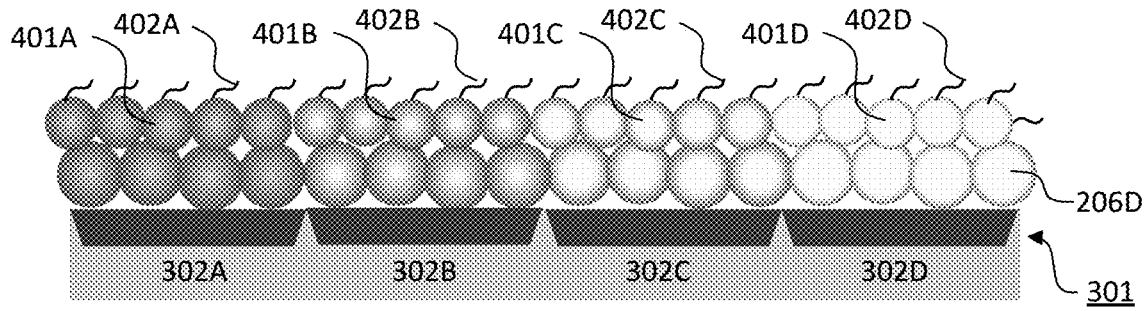
FIG. 4C
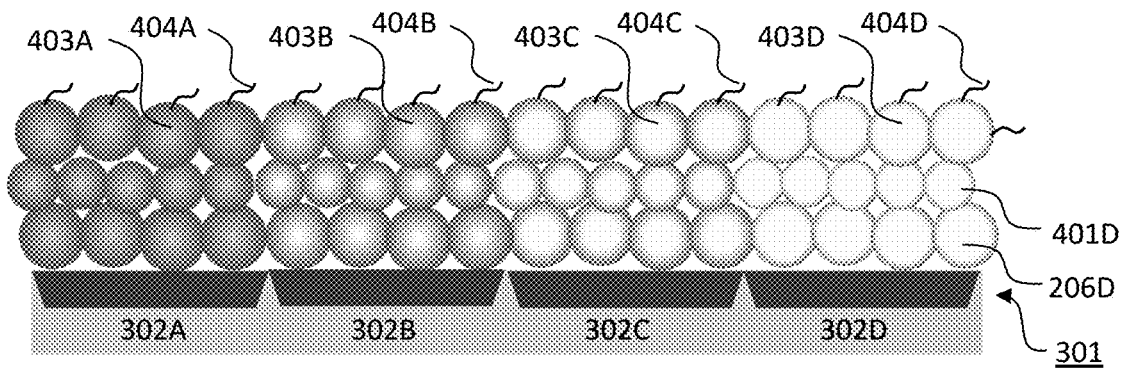
FIG. 4D
FIG. 4

METHOD FOR ASSEMBLY OF ANALYTE FILTER ARRAYS USING BIOMOLECULES

This application is a divisional of and claims the benefit of U.S. application Ser. No. 13/070,077, filed Mar. 23, 2011, now allowed. U.S. application Ser. No. 13/070,077, is incorporated by reference herein in its entirety, to provide continuity of disclosure.

STATEMENT REGARDING FEDERALLY SPONSORED RESEARCH

The invention was made in part with government support Contracts FA8650-05-M-1893 and FA8650-06-C-1016 from the Air Force Office of Scientific Research and by Grant 1R43GM076859-01 from the National Institutes of Health, National Institute of General Medicine Studies. The U.S. Government has certain rights in the invention.

FIELD OF THE INVENTION

The present invention relates to the field of microdetector array devices for sensing analytes (molecules and ions). More particularly, methods are provided for placing arrays of molecular and ionic filter material on detector arrays.

Miniaturization has increased the efficiency of numerous microelectronic processes and detection devices and is contributing to the development and production of smaller, lighter, and faster versions of mechanical, optical, and electronic devices such as computers, cameras, mobile phones, and molecular or ionic detection systems. New technological capabilities in miniaturization have also had a large impact in the area of microsensor arrays. Microsensors have the ability to measure and analyze thousands of differential individual responses that collectively can be used to detect and analyze complex vapor and solution targets. Some examples include "odorprint" detection and blood analyte panels (See for example Barash et al. 2009, Lee et al. U.S. Pat. No. 7,859,029B2, Michel et al. U.S. Pat. No. 5,694,932). A key enabling component of these examples and many other microsensors is the ability to "sensitize" or modify the surface of individual detectors with molecular agents that impart differential functional chemistries to the sensor. "Sensitization" is defined as adding a component to the surface of, or integrally mixing with, the active transducer element of the detector. Sensitization of each detector in the microsensor array then provides differential response patterns for components of complex molecular or ionic mixtures. Methods that involve serial deposition to sensitize individual detectors in an array such as printing, or sequential methods such as lithography, can be slow and costly when the number of detectors in the array is large and the size of individual detectors is small. Both of these attributes are desirable for increasing the detection range (i.e. dynamic range of detection for any or all of the components of the mixture), or detection capacity (sensitivity with which an individual sensor responds to a target, or target component of a mixture.

Likewise, creating microsensor arrays with overall small dimensions provides a means to make more compact sensors which can be used in a number of applications ranging from small waste streams, biomedical in vitro and in vivo devices, discrete environmental monitoring, to name a few. Present methods for making and sensitizing detectors in a microsensor array using "top-down" methods such as photolithography, currently used for the manufacture of the extremely small components in these miniature devices, have slowed progress in this area (Bashir et al., 2001). The use of micro- and nanoscale structure assembly is under evaluation as a means to drive miniaturization of microelectronic and other sensor devices (McNally et al., 2003). These extremely small-scale materials often exhibit properties that are different from their physically larger counterparts. In systems with micro- and nanoscale dimensions, these properties are often "tunable" or adjustable. This can make such systems more useful for specific applications, such as biomedical sensors, industrial fluid stream analysis, targeted drug delivery and molecular detection in air or water. Detector substrates may include arrays of solid-state sensing elements such as chemiresistive arrays composed of carbon nanotube, semiconductors, and conducting polymers (See for example Wang et al. 2008; Nlkfarjam et al. 2010; Voronov et al. 2010; Kang et al. 2009; Jiang et al. 2009, Ubaldo et al. U.S. Pat. No. 6,028,331), Field Effect Transistors (FETs) (Wakida et al. 2007, Vijayalakshmi et al. 2008, Kakoschke U.S. Pat. No. 7,786,530, Edinger U.S. Pat. No. 7,335,942), Ion-Selective Field Effect Transistors (ISFETS) (Zehfroosh et al. 2010; Abdullah et al. 2009, Lindner et al. 2009, Kunath U.S. Pat. No. 7,321,143), Thin Film Transistors (TFTs), for example Fortunato et al. 2006, Song-hua et al. 2006, and other ion-specific or electrochemical transducers (Geiling et al. 2006; Mizier 1983, Crumly et al. U.S. Pat. No. 6,849,168, Patel et al. U.S. Pat. No. 7,489,017.

New approaches for making sensing elements that involve solid-state chemiresistive semiconductor structures that are patterned on the nanoscale may also be employed in microsensor arrays. For example, a patent application related to microsensors that is commonly owned with the present application and titled "Imprinted Semiconductor Multiplex Detection Array" was filed on Jan. 11, 2011 (application Ser. No. 13/004,381).

Positional assembly of arrays of exceedingly small micro- and nanoscale unit components by conventional manufacturing techniques is exceedingly difficult. As such, cost-effective and mass manufacture of such devices has not yet been realized. Therefore, the discovery and development of novel methods for "bottom-up" fabrication has recently emerged as an active field of study. A need exists to adopt efficient fabrication and manufacturing procedures for the production of new and useful, micro- and nanoscale devices.

Specifically, what is needed is a process for expanding the parallel detection capabilities of microsensor arrays to enhance the selectivity, sensitivity, dynamic range, and background rejection capabilities in measurement of the signatures of complex gas, liquid or molecular and ionic solution mixtures directly on the detector array, or onto a substrate that can be applied, or transferred to the detector array. Methods that enable the manufacturing of dense and overall compact microsensor arrays will enhance numerous applications in molecular and ionic detection of complex mixtures and solutions. More particularly, methods that will lead to the deposition of the sensitization moiety on each sensor in the array during a single batch processing step are desired.

The efficient manufacture of micro- and nanoscale structures for use as miniature filter devices is made possible by the use of assembled arrays, which provide a means for the assembly of micro- and nanoscale filters with precisely positioned functional subunits. Efficient detection of components of various mixtures is enhanced by the filtration of mixtures prior to detection with micro- and nanoscale detection devices. The manufacture, using biomolecule-guided assembly, of functional micro- and nanoscale filters and their use for various applications such as complex gas and ionic solution mixture analysis is disclosed. Commercial detection systems are limited to the packaging of arrays of relatively large individual sensors which include macroscopic filter particles packaged over the sensor, see for example Figaro, Arlington Heights, Ill., USA, and Portsmouth Hampshire, United Kingdom, and Axion Biosystems, Atlanta, Ga., USA.

As used herein, a "filter array" or a "filter particle array" refers to an array of particles on a surface that removes or reduces an amount of a component from a mixture that traverses the array. As used herein, "traverse" means passing through, over, or across. "Filtering" is used herein to mean reducing the amount or concentration of at least one component of a mixture or removing or depleting at least one component of a mixture. "Filtering" may occur by the movement of a mixture through, across, or over a filter of the invention. "Removing" or "removal" is meant to refer to complete or partial depletion of a component in a mixture, or retardation of the traversal rate of one or more components of the mixture, giving rise to a delay in the temporal detection of one component relative to another. The terms "reducing", "removing", "depleting", "retarding" or "filtering" or any variation of these terms are used interchangeably, and when used in the claims and/or the specification mean causing any decrease in the amount or concentration of at least one component of a mixture to achieve a desired result. As used herein, the term "filtrate" refers to the components of a filtered mixture that have traversed a filter array.

In aspects of the invention, filter particles may cause filtering, by binding, absorbing, reflecting, repelling, excluding, or encapsulating a component or by engaging in a reaction, such as a chemical reaction, which modifies or destroys a component of a mixture or transforms it into sub-components or other components. These actions may prevent or reduce the passage of a component through a filter or reduce or eliminate the component from the mixture following filtration.

For the purposes of the invention, a "mixture" refers to a composition having two or more different components. In an aspect of the invention, one or more components of a mixture retain their own properties and makeup. In another aspect, two or more components of a mixture may interact and produce a mixture with properties distinct from those of the individual components. In yet another aspect of the invention, a mixture may comprise a combination of components including those that retain their properties when combined with other components and those that interact with other components upon combining and have properties distinct from those of the components prior to combining. In aspects of the invention, all components of a mixture may not be known prior to or after filtration. Mixture may refer to a combination of components prior to or after filtration. Similarly, a filtrate may comprise a mixture of components.

A filter particle array may filter many types of mixtures. Mixtures may occur as blends, solutions including ionic solutions, suspensions, or colloids and may comprise one or more of a liquid, a solid, a gas, a biomolecule or combinations thereof. Mixtures may comprise, for example, molecular gaseous species, inorganic compounds, organic compounds, biomolecules, ionic molecules, or combinations of these. Simple mixtures (containing only a few components) or complex mixtures (containing numerous components) may be filtered using filter arrays of the invention.

The components of a mixture that are filtered using methods of the invention may be separated or partially separated after filtration. In some aspects of the invention, fewer components are present in the filtrate than were present in the mixture prior to filtration. In other aspects, the filtrate may contain a lower concentration or amount of one or more component than was present in the mixture prior to filtration.

BRIEF SUMMARY OF THE INVENTION

A method of manufacture using biomolecular binding forces to assemble micro- and nanoscale structures into an array of functional gas, liquid, solution or ionic filters is provided. Precisely positioned functional filter elements at specific locations in an array may be formed by binding of complementary biomolecules that carry filter particles to anchored biomolecules on addressable regions of a detector array surface. Biomolecular binding directs the filter particles to specific array locations during a batch binding step. Multilayers of registered micro- or nano-scale particles may also be fabricated.

BRIEF DESCRIPTION OF THE DRAWINGS

The invention may be better understood by reference to one or more of these drawings in combination with the detailed description of specific embodiments presented herein.

FIGS. 2A, 2B, 2C, 2D and 2E are isometric views showing an example of a filter particle array at various stages of assembly.

FIGS. 3A and 3B are isometric views showing different substrate embodiments.

FIGS. 4A, 4B, 4C and 4D are cross-section views of a filter particle array made by the addition of different particles, represented by different shadings and sizes, during multiple attachment steps.

DETAILED DESCRIPTION OF THE INVENTION

A method for using the principles of microarrays in a different technology to construct functional mechanical devices is disclosed herein. In a preferred embodiment of the invention, nucleic acid, or DNA microarrays are used to fabricate filter particle arrays through biomolecule-guided assembly of the filter particles to specific regions of the microarray. Biomolecule-guided assembly of filter particles is performed by first synthesizing or otherwise fabricating a microarray. Microarrays, or "arrays," are well known and widely used in molecular biology. Arrays used in embodiments of the invention can be, for example, arrays of proteins, peptides, antibodies, antigens, aptamers, nucleic acids, ligands, receptors, chemical compounds, or arrays of other biomolecules. Numerous examples of how to make these types of arrays and useful substrate surfaces can be found in Platt et al., 2009; Chabra et al., 2007; McCauley et al., 2003; Ivanov et al., 2004; Stadler et al., 2007; Oleinikov et al., 2003; U.S. Pat. No. 7,297,497; U.S. Publication Nos. 2004/0072274, 2007/0015213, 2004/0038307, 2005/0095649, 2008/0293591, 2009/0018027, as well as WO 2003/095469A1. Microarrays entail binding between anchored probe biomolecules that are coupled to a surface and target or complement biomolecules. A type of microarray is a DNA or an RNA microarray. DNA microarrays consist of an arrayed series of thousands of microscopic areas of DNA oligonucleotides, each containing a specific DNA sequence—called an anchored probe. Hybridization between anchored probe biomolecule sequences and complementary target sequences in solution is detected by various ways to indicate the relative abundance of nucleic acid target sequences in the sample. Methods and apparatuses for preparing DNA microarrays are well known in the art. DNA microarrays are commercially available from numerous providers.

Figure 1:
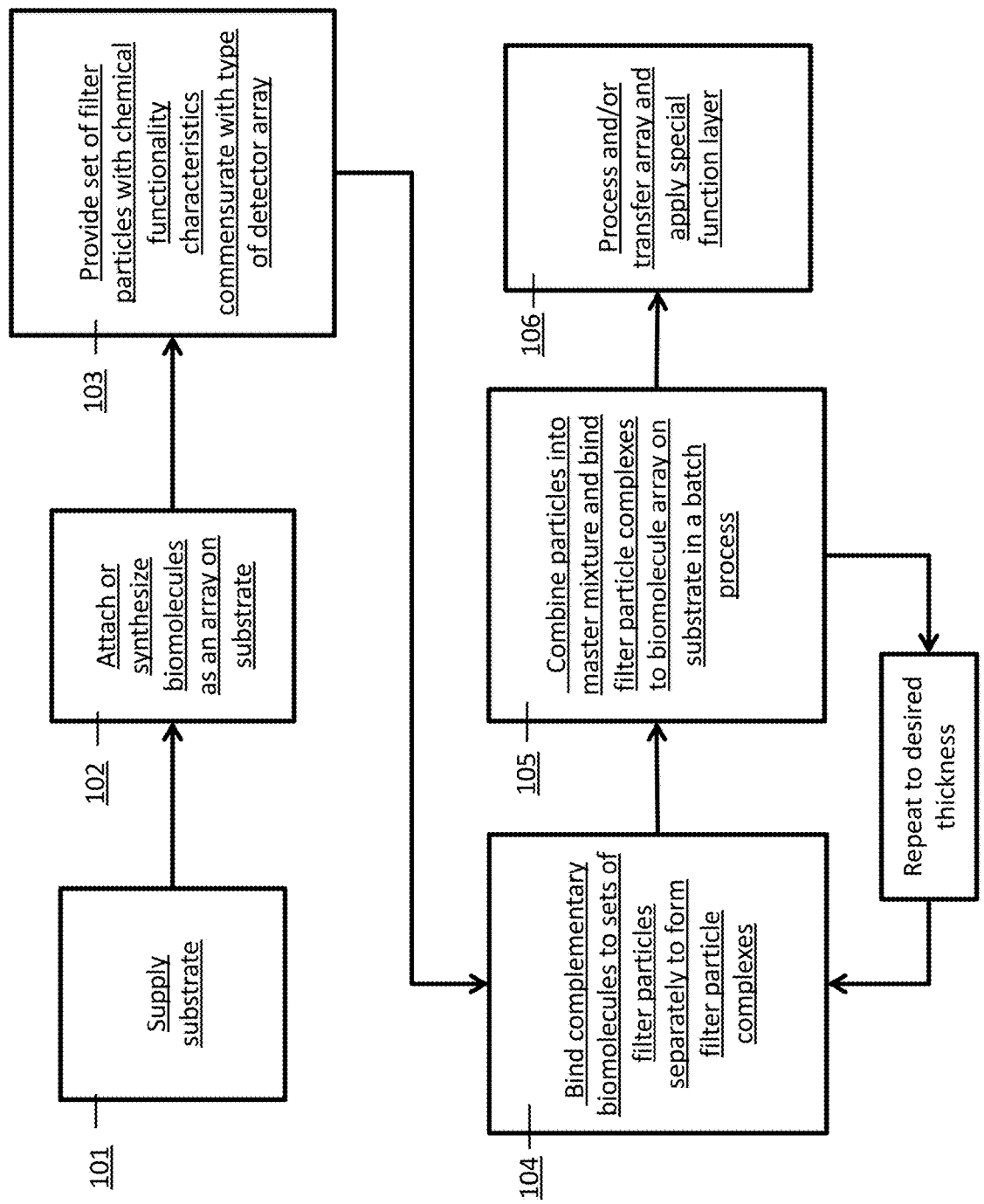
FIG. 1 illustrates the process for making filter particle arrays using a biomolecular assembly process.

Referring to FIG. 1, methods for using the binding properties of biomolecular arrays to manufacture a filter array device is illustrated. In this process, a substrate is supplied in step 101. The substrate may be a detector array such as an array of gas or analyte detectors. Alternatively, the substrate may be a supported membrane that provides macroscopic filter for background interferents such as water while enabling the reactive gas species to traverse the filter array. In this context, the microarray-bearing substrate could be inverted and applied to the surface of an array of detectors. In another embodiment, the substrate may be an intermediate transfer stamp used to assemble the array and transfer the assembled array to a second substrate such as a detector array. In step 102, an array of biomolecules is formed on the substrate from step 101. Multiple methods are known in the art for populating biomolecules onto surfaces into arrays including methods that involve spotting oligonucleotide or peptide sequences, or alternatively synthesizing oligonucleotides or peptides in situ via single nucleotide or amino acid coupling.

By way of example, the method of Photo-Generated Reagent (PGR) provided in U.S. Pat. Nos. 6,426,184; 7,491,680; 7,544,638; and 7,838,466; and U.S. Patent App. Pub. No. 2007/02246216 may be used. A microfluidic device cover is placed over the supplied substrate. The device includes many reaction chambers, which are sized and arranged so as to register with the image sensor array to which the filter is to be applied. Photo-generated reagents are formed by illumination with light in specific fluid compartments throughout the array. Light provides a means to activate a chemical process that results in acid generation, which enables synthesis of part of a DNA molecule when a nucleotide solution flows across the array in a subsequent step. Areas where no light exposure occurs do not react in that step. The process is repeated until each array area is populated with sequences of biomolecules, referred to as anchor probes. Because the position of the light illumination is chosen during manufacture of the array, the sequence of each anchor probe in the collective set in the array is known and recorded as a library of the anchor probes.

Because the sequences of the set of anchor probes are known for each position in the array, complementary binding sequences to those probes are used to direct the attachment of filter particles to specific locations in the array from the dispersion of filter particles supplied in step 103. In embodiments of the invention, filter particles may comprise a "bead" or "polymer sphere" or "microsphere" that is inherently reactive or interactive toward a particular target analyte, or is capable of being loaded, impregnated, derivatized, functionalized, or enriched with other smaller particles or pigments that impart enhanced molecular or ionic interactive or reactive properties to the filter particle. In other embodiments of the invention, smaller particles may be attached directly to a small molecule or biomolecule linking moiety. The linking moiety is used to derivatize the smaller particles, macromolecules, or reactive molecules with the filter particles. Modification or derivatization may include covalent coupling of interactive or reactive small molecules, macromolecules, polymers, nanoparticles, ionic complexes or other moieties that impart distinct gas, ionic or liquid interactive or reactive properties to the filter particles.

In other non-limiting examples, particles may comprise block co-polymers bearing functional side groups that are incorporated during synthesis of the particle. In still other examples, physical partitioning of the interactive compound, pigment or smaller particle by hydrophobic swelling and core diffusion may be used to incorporate molecular functionality to the particles. Modified microspheres are available from a number of vendors, with chemical coupling and derivatization processes readily available (e.g. Polysciences, Inc., Warrington, Pa., USA and Cenospheres, Inc. and Spherotech, Lake Forest, Ill., USA). Suitable compositions of derivatized polymer beads are numerous and will vary depending on the application and whether or not additional compounds, pigments, molecules, biomolecules or other linking moieties are attached to, or impregnated in the bead. U.S. Pat. Nos. 6,268,222; 6,327,410; and 7,335,153, U.S. Publication Nos. 2002/0146745 and 2006/0068504, and PCT Publication No. WO/2002/103371 describe numerous non-limiting examples of bead and particle compositions suitable for embodiments of the invention.

In other embodiments, smaller particles or pigments may comprise polymeric (hydrophobic or hydrophilic), metallic, ceramic or other chemically active nanoparticles that may be covalently coupled or physically partitioned into the core of a polymer microsphere. In still other aspects of the invention, the chemically active moiety may be a microparticle or nanoparticle comprising an ionic polymer or small ionic molecule that interacts differentially with ions in a mixture. The polarity of the charge i.e., positive or negative, the degree of ionization i.e., monovalent or multivalent, and the charge density i.e., concentration of small molecule ions or density of charge along the backbone of macromolecules are non-limiting factors affecting the interaction between the filter particle and the target species.

Particles, beads, spheres, or microspheres need not be spherical. Particles may be of any geometrical shape or may be irregularly shaped. Particles may also be solid, hollow, or porous and may be composed of more than one material or substance or numerous layers of substances. Particle sizes may range from nanoscale, on the order of nanometers (e.g., less than or equal to about 100 nm), to millimeter scale (e.g., less than or equal to about 1 mm). In embodiments of the invention, particles of mixed sizes may be used for making a filter particle array. By way of example, U.S. Pat. Nos. 6,327,410 and 7,335,153, and U.S. Publication Nos. 2002/0146745 and 2006/0068504 describe numerous bead and particle compositions and sizes suitable for embodiments of the invention.

As used herein, for brevity and ease of reading, the terms nanoscale and microscale are inclusive and used to indicate both microscale and nanoscale dimensions. In embodiments of the invention, arrays, structures, assemblies, particles, devices, or portions thereof may have dimensions that are entirely microscale, entirely nanoscale, or mixed nanoscale and microscale. In other embodiments of the invention, structures, assemblies, devices, particles or portions thereof may have dimensions that are greater than or equal to one hundred micrometers.

Particle types may also differ in their filtering capacities or functions or other characteristics. The one or more types of filter particle attached to a detector array in a first or additional attachment steps may be all the same type of particle or multiple types of particles. That is, particles in all adding steps may be of the same or different shapes, sizes, and compositions and may have the same or different filtering functions or capacities. Therefore, in embodiments of the invention a filter particle array comprises one, several, numerous, or many types of particles.

In all embodiments, microspheres are modified, derivatized, or functionalized with the molecular or ionic interactive compounds so as to be capable of affecting the rate and ability of target compounds from traversing the filter particles en route to the detector array. The range of interactions is not limited to any particular chemical functional group or chemical interaction type provided a suitable molecular or ionic interaction is imparted by the assembled filter particle array.

Assembly of filter particle arrays shown in FIG. 1 step 104 begins with attaching complementary sequences to particles, thereby forming a "filter particle complex." As used herein, the term "filter particle complex" refers to filter particles having a moiety attached thereto that mediates binding to a complementary moiety on a surface. In the present embodiment, a binding moiety comprises a nucleic acid that is complementary to a nucleic acid of a nucleic acid array on the substrate supplied in step 101. In other non-limiting examples, a binding moiety may comprise biotin, streptavidin, or another chemical entity capable of interacting with a complementary entity of an array on a surface. Binding moieties that form the filter particle complex are distinct from any binding moiety that may have been used to anchor derivatization compounds onto the filter particle. Binding moieties illustrated in sequence 104 are used expressly to direct the assembly of individual filter particles to specific regions in the formation of the filter particle array, and are generally present on the external surface of the filter particles. Non-limiting examples of binding moieties include nucleic acid fragments, polynucleotides, oligonucleotides, proteins, peptides, ligands, receptors, antigens, antibodies, and individual members of biological binding pairs. In other embodiments, a filter particle complex comprises a linking structure that connects the particle to the binding moiety. For example, a filter particle may be attached directly to a nucleic acid or through a linking moiety such as a terminal amine or carboxylate group, or through multiple linking moieties, such as, for example, biotin and streptavidin. Methods for the attachment of various binding moieties to particles are known in the art (see e.g., U.S. Publication Nos. 2002/0028455 and 2002/0146745 and U.S. Pat. No. 6,327,410.

Once individual complementary sequences specific to anchor probes in the array are coupled to the surface of individual filter particles, a subset of particles for each type of filter particle is combined into a master mixture or dispersion of multiple types of filter particles (FIG. 1. step 105). This dispersion contains all of the filter particle elements that are desired for manufacture of a particular pattern of a filter particle array. In step 105, exposure of the dispersion of particles to the anchor probe microarray on the substrate will lead to assembly of each filter particle element into the pre-designed pattern, or mosaic pattern. This occurs during a single batch step, regardless of the dimensions of the array. The assembly process may be repeated as needed with yet a further set of filter particles that is complementary to the first set of particles to increase the thickness of the filter particle array.

As a final measure, step 106, optional post processing steps such as washing to remove non-assembled particles, annealing and addition of special function layers such as spin-on or placement of a common porous macroscopic filter or wetting membrane, for example, will provide the final structure of the filter particle array. Non-limiting example detector substrates include arrays of solid-state gas sensing elements such as chemiresistive arrays, Field Effect Transistors (FETs), Ion-Selective Field Effect Transistors (ISFETS), Thin Film Transistors (TFTs). In another embodiment, a porous membrane with the synthesis support backing removed, inverted and applied to the surface of the gas or ionic detector array may impart any combination of enhanced sensitivity to the device. In the final structure, the assembled filter particle array may completely, or partially, interact with any and all target compounds traversing the filter to the detector array. Interactions with selected targets in one region of the assembled filter particle array relative to another may create differential temporal responses from a mixture of target compounds, which may be used to create complex target compound signatures.

Figure 5:
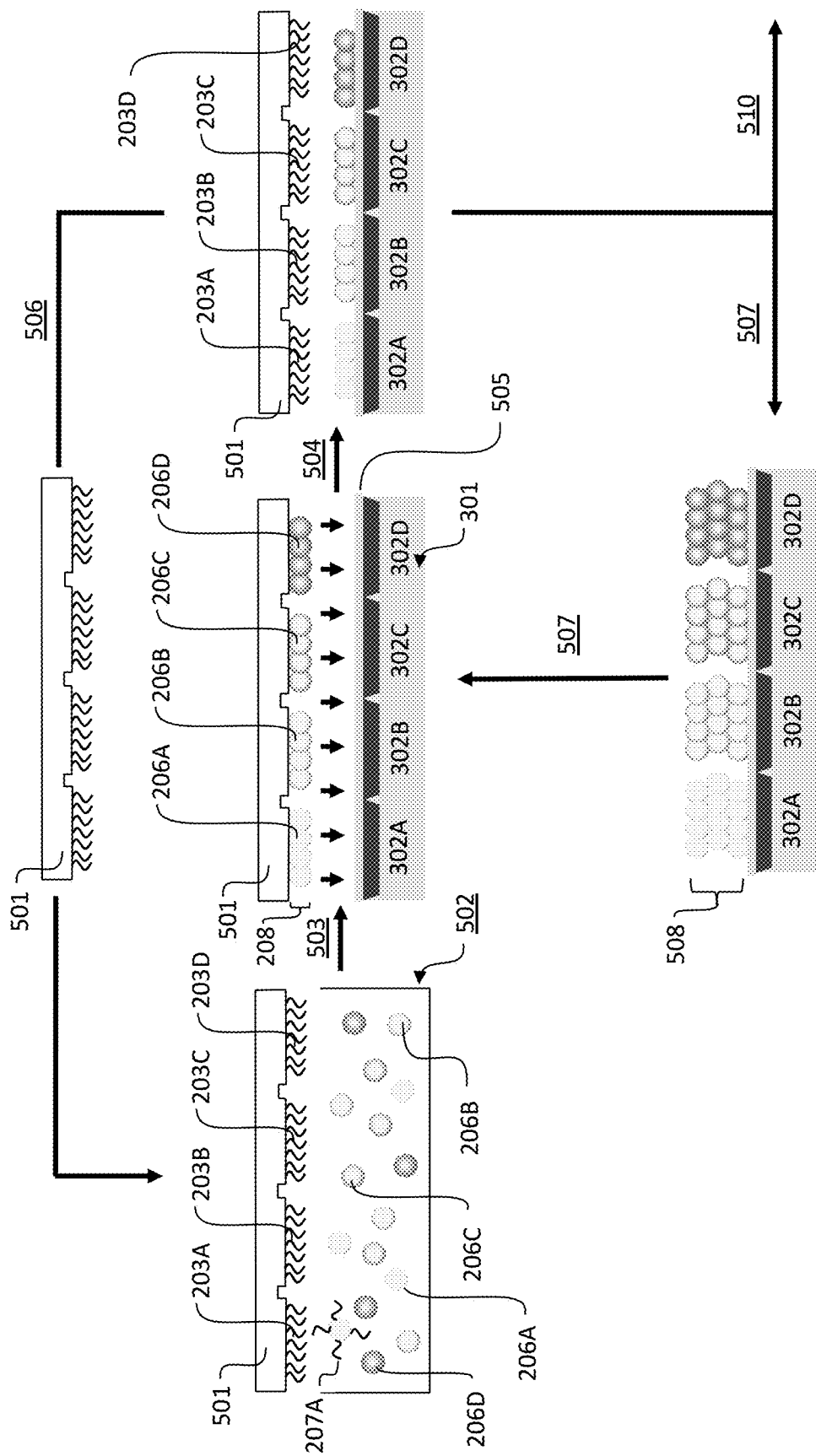
FIG. 5 is a schematic showing the process for using a stamp substrate to assemble a filter particle array and transfer the array to addressable regions of a detector array.

FIG. 2A shows substrate 201, upon which a nucleic acid array can be synthesized. The substrate may comprise a detector array where the nucleic acid array is synthesized directly from the surface of individual detector elements, for example. In another embodiment, the substrate may comprise a material with special function such as a porosity that permits passage of gas, but blocks particulates, or a wetting membrane for ionic solution transport. The filter array on a special function substrate may be joined with the detector array by inverting the substrate and positioning the filter array in contact with, and registered to, the detector array. In another embodiment, the substrate may comprise a stamp that can be used to transfer the pattern in a subsequent step (FIG. 5). Substrate 201 may include any number of layers that may be used to enhance or protect the response of the detector array relative to the filter.

In the embodiment where the filter array is deposited directly on the detector array, it may be present on the entire array surface or on selected regions of the detector array. In most embodiments, the filter array is registered one-to-one with each pixel in the detector array. However, one-to-one registration, defined as the condition when the spatial area of a single filter particle element corresponds exactly with a single detector pixel, is not required. Alternate embodiments include a single filter particle array region that is registered to multiple detector pixels and need not have square dimensions.

FIG. 2B shows distinct, arrayed nucleic acid sequences 203A-D, the "microarray", attached to substrate 201 that defines addressable regions 204A-D of a "unit cell" 205 of the filter particle array. Filter particle complexes, shown in FIG. 2C, have filter particles 206A-D with each particle type having nucleic acids 207A-D that are complementary to nucleic acids 203A-D in one section of unit cell 205. FIG. 2D shows the assembled unit cell 205 following hybridization of complementary nucleic acids 207A-D on filter particles 206A-D to the anchored nucleic acids 203A-D in the microarray. For clarity, the nucleic acids on particles that do not participate in hybridization to the microarray are not depicted in the diagram. Such nucleic acids are available for binding additional particles in subsequent steps of filter particle array assembly.

During assembly, it is preferred to employ varying conditions of hybridization to achieve varying degrees of selectivity of nucleic acid 207 toward anchored nucleic acid 203. In a non-limiting example, hybridization of a related nucleic acid that does not hybridize to a complementary or partially complementary nucleic acid under stringent conditions may be achieved by hybridization at low temperature and/or high ionic strength. Such conditions are termed "low stringency" or "low stringency conditions," and non-limiting examples of low stringency include hybridization performed at about 0.15 M to about 0.9 M NaCl at a temperature range of about 20° C. to about 50° C. Because hybridization sequences 203 are predefined and not constrained to any particular sequence such as required for DNA detection methods, selection can be made to minimize sequence hybridization interference. It is within the skill of one in the art to select appropriate non-interfering sequences and further modify the low or high stringency conditions to suit a particular application.

FIG. 2E shows how unit cell 205 can be repeated to form a larger filter particle array 208. The diagram illustrates filter particle array 208 comprising a series of filter particle subunit regions (i.e., "unit cells") 205A-N. The illustration depicts the stage following removal of the nucleic acids and after other potential conditioning steps such as heating, reflowing, chemical fusion or addition of a continuity layer. Continuity layers may comprise a macroscopic filter for removing, for example, water vapor or a carbon filter for removing, for example, large organic molecules in the vapor phases, or an optical light source array for exciting charge carriers in a detector having active semiconductor detector elements. For clarity, the collection of filter particles 206 for any given addressable region is represented schematically as flattened cubes or squares.

FIG. 3A illustrates the embodiment where filter particle array unit cell 205, consisting of filter particle elements 206A-D, is deposited on substrate 201 that comprises a thin film transistor detector array 301. Detector array 301 may consist of addressable detector elements 302 such as chemiresistive metal oxide semiconductor layers that respond electrically to gas interactions at the surface. Alternatively, detector array 301 may be composed of an array of nanoimprinted metal oxide semiconductors that possess high gas sensitivity due to the large surface area to volume of the semiconductor. Other embodiments of detector array 301 may include arrays of platinum or other noble metal detectors, or arrays of electrochemical cells with metal electrodes. An intermediate layer 303 such as a response enhancement layer such as a gate dielectric layer on detector array 301 may be included. Intermediate layer 303 may also consist of, for example, a custom linkage layer for attachment and positioning of nucleic acids above the surface of the detector array. As a final measure, an optional macroscopic filter outermost layer 304 may be added to complete the filter particle array assembly 305. Outermost layer 304 may provide a means for removal of water vapor, or for binding, a large class of compounds such as reactive gases prior to detection of non-reactive species such as carbon dioxide, for example. Outermost layer 304 may also perform functions such as cellular filtering (red blood cells, white blood cells, platelets), for example, in the case of blood chemistry analysis.

FIG. 3B illustrates an embodiment where filter particle array unit cell 205 is assembled first on substrate 201, shown at the top of the stack. As an example, substrate 201 can be a membrane that provides both porosity and structural support for the array. Numerous possibilities exist for the composition of substrate 201. In the embodiment depicted in FIG. 3B, filter particle array unit cell 205 would be arranged such that 205 would first be deposited onto substrate 201, inverted, registered to, and placed in contact with detector array 301. Any embodiment for substrate 201 must be amenable to coupling or synthesis of the microarray. The face of substrate 201 not having the filter particle array attached thereto would serve as the outermost layer of the assembled filter particle array device 305. This component of the apparatus would be designed to allow gas or fluid to pass over the array. The dimensions of this layer may span multiple detector arrays with like filter particle arrays used to provide simultaneous measurement of clean, dry air, or a specific buffer concentration and the target compound or compounds.

In some embodiments, attachment of filter particles 206 to detector array 301 bearing microarray 203A-D is performed more than once to form multilayers. This may involve repeatedly performing the hybridization step with the same type of particles so as to increase the number density of a specific type of particle 206 in filter particle array 208. In other embodiments, the hybridizing step is repeatedly performed with one or more different types of particles. All hybridizing steps may be repeated one or more times until the desired density of filter particles 206 is achieved. FIG. 4A shows a cross section view of detector array 301 having four addressable regions 204A-D consisting of four addressable detector elements 302A-D, each detector element having a distinct nucleic acid sequence represented by 203A-D that is attached to the surface of detector array 301 of FIG. 3. FIG. 4B shows the attachment of four different particle types 206A-D to each of the four addressable regions 204A-D. Nucleic acids 207A-D attached to filter particles 206A-D may mediate attachment of additional particles 401A-D bearing nucleic acids 402A-D that are complementary to nucleic acids 207A-D attached to particles 206A-D (FIG. 4C). FIG. 4D shows the further attachment of additional particles 403A-D in another hybridization step mediated by nucleic acids 404A-D complementary to nucleic acids 402A-D (FIG. 4C).

In another embodiment, illustrated in FIG. 5, filter particle array 208 may be formed on a substrate that consists of transfer stamp 501. Transfer stamp 501 may be used to first assemble filter particle array 208, then transfer assembled filter particle array 208 to another substrate such as detector array 301. The process begins with the assembly of microarray 203A-D on transfer stamp 501. Transfer stamp 501 may have a planar surface, or may contain relief structure for assisting in release. Transfer stamp 501 is immersed in fluid vessel 502, which contains the dispersion of filter particles 206A-D bearing complementary nucleic acids 207A-D. Immersion of transfer stamp 501 results in assembly of filter particle array 208 on transfer stamp 501 via step 503. Transfer stamp 501 bearing filter particle array 208 can then be brought in contact with a second substrate such as detector array 301 illustrated in step 504. Detector array 301 may contain an adhesion, or linking layer 505 that promotes release and transfer of the assembled filter particle array to detector array 301 from transfer stamp 501. In a preferred embodiment, linking layer 505 is a thin adhesive that serves to seat assembled filter particle array 208 during contact.

Other methods for transferring a filter particle array may include encapsulation of the assembled array in a protective coating such as a hydrogel, or an oligosaccharide or polysaccharide coating, followed by stamping onto photodetector array 301 and subsequent removal of the hydrogel or coating, if desired. As a non-limiting example, ultra-low-melting temperature agarose is a thermo-reversible, physically cross-linked hydrogel that can be used for encapsulating and transferring an array. Following transfer to detector array 301, the agarose can be re-melted at 50-55° C. so as to release the filter particle array while retaining the integrity of filter particle array 208 and the activity of the filter particles.

In yet another example, a saccharide solution such as 1% trehalose may be dried or lyophilized onto the filter particle array 208 to maintain its integrity during transfer to another substrate. Rehydration following transfer can be used to remove the saccharide solution. In some aspects, it will be useful to rehydrate the saccharide in a solution that maintains hybridization between complementary nucleic acids.

In most transfer methods, it will be desirable to perform a denaturation step to facilitate release of hybridization. Hybridization release serves to separate the assembled particles by releasing the chemical energy in the hybridization bonding. Secondly, denaturation serves to keep the microarray intact for re-use and re-assembly of additional layers or depositing onto additional substrates. Upon melting or chemical denaturing of the hybridized DNA complex, assembled filter particle array 208 preferentially remains on detector array 301. Chemical denaturation may involve specific denaturing agents such as high salt, or low salt environments or other specific intercalants. Methods for controlled denaturation of hybridized nucleic acids are numerous and well known in the art.

Following denaturation of nucleic acids 207, and/or linking layer 505, the filter particle array will adhere in situ to the surface on which it was transferred. In the preferred embodiment, separation of stamp 501 from detector array 301 leaves an intact microarray 203 on the surface of transfer stamp 501. Stamp 501 can then be used in a repetitive manner to assemble additional filter particle arrays 208 as illustrated by step 506 in FIG. 5. This process could include the addition of multiple layers of the assembled filter particle array onto the same substrate. Deposition of repeated multiple layers onto detector array 301 is illustrated schematically in the cyclic process step 507. The schematic representing step 507 illustrates detector array 301 with three transferred layers of assembled filter particle array 208 forming filter particle array assembly 508.

Following transfer of a single, or multiple assembled filter particle array(s) 208 to detector array 301, the device may then receive final processing treatments including any special function layers such as application of a macroscopic common filter layer or wetting membrane, step 510. At any point in the process removal of nucleic acids 203 or linking layer 505 may occur, if necessary. A number of chemical agents for degrading nucleic acids as well as high temperature exposure can lead to nucleic acid removal. The adhesive layer may be left intact in the final device setting or be removed by chemical degradation, treatment with irradiation such as UV irradiation, or burning or ashing in the case where the reactive compound e.g., carbon black is tolerant to high temperatures and remains intact after processing.

Physical features present on the surface may maintain the integrity of the assembled filter particle array. The nature of the material interaction may provide sufficient structural integrity for the filter particle array to be separated from the substrate and function as a stand-alone film, either independent or assisted by a common layer that provides backing support. As non-limiting examples, this may include deposition of a common layer such as a moisture blocking membrane that partially, or entirely covers the filter particle array. Common layers such as wetting membranes, moisture barriers, or carbon filters are commercially available (e.g., Pall Corporation, Port Washington, N.Y., USA and Millipore, Billerica, Mass., USA).

In all embodiments, it is desirable to maintain the functionality of the filter particles and the functionality and integrity of the filter particle array. As used herein "integrity" means whole, undivided, or undiminished. Alternatively, the array substrate or sections thereof may be surrounded by raised regions of the surface such that filter particles are physically constrained. Exemplary methods for the derivatization of substrates and particles for purposes of attachment of particles to surfaces are described in U.S. Pat. Nos. 6,327,410 and 7,335,153 and U.S. Publication Nos. 2004/0248144 and 2002/0146745. Filter particle arrays may be transferred to or from any type of surface. In this aspect, it is desirable that the act of transferring maintains the array integrity. In some aspects, transferring an array to a different surface may enhance the usefulness or operability of the array, and may increase the manufacturability, since the microarray template used to assembly the filter particle array may be repeatedly used to assemble and transfer filter particle arrays to multiple devices.

Figure 6:
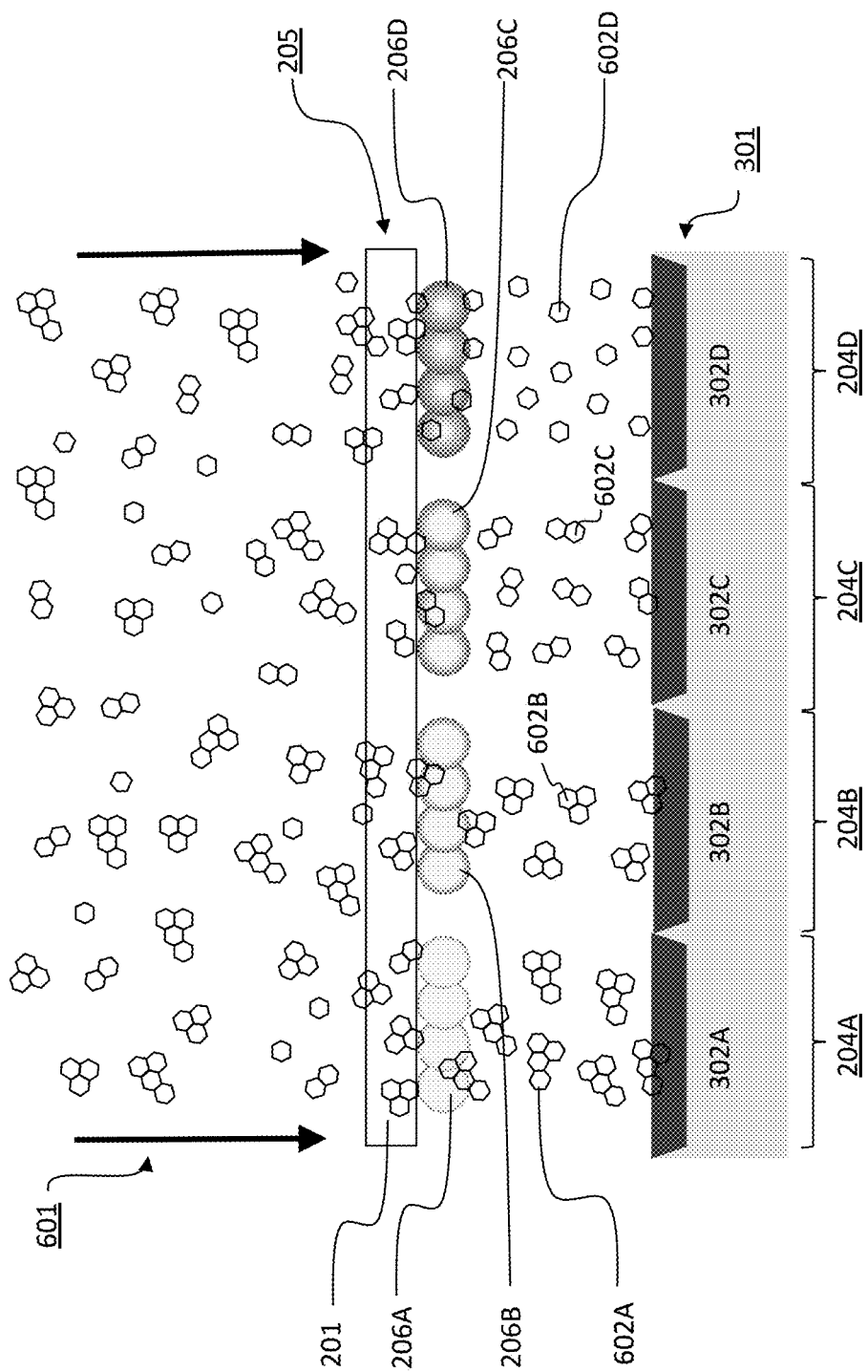
FIG. 6 is a cross-section view illustrating complex gas filtering performed by a filter particle array having four different types of filter particles affixed at four addressable regions of the detector array. The filter particle array is detached from the substrate in the drawing to increase clarity.

Filter particle arrays that filter different gas phase species and methods for making and using gas filter arrays are illustrated in FIG. 6. A gas filter array functions to remove one or more gas species from a gas mixture 601 passing through the filter. One example of a filter is carbon black. Carbon black filters organic gas species with some degree of polarizability while other small and nonpolar gas phase species such as carbon dioxide or hydrogen are permitted to pass through those sections of the filter. In some aspects, one or more gas species or a chemical class of gas species may pass through certain sections of a filter array while other species or other classes of gas species pass through other sections of the array. Therefore, a filter array may have one or more array regions that remove or reduce specific gas species from the mixture and/or that provide a means for certain gas species to traverse the array region. The assembly method of the invention could be broadly applied to any number of different chemical classes of gases including non-polar or inert through a range of chemically active species up to reactive, corrosive, or toxic gases. Filtering of any or all types of gaseous species can be achieved on the same device provided particles are selected for interaction or reaction with the target gas species and assembled into filter particle arrays using methods of the invention.

FIG. 6 shows a representation of a detector array 301 having four addressable detector elements 302A-D representing four addressable regions 204A-D. Gas filtering by unit cell 205 of filter particle array 208 that is composed of four unique filter particle elements 206A-D is illustrated in cross section. Filter particle complex 206A-D is shown attached to detector array 301. Gas mixture 601 impinges on filter particle array unit cell 205. This assembly is represented in FIG. 3A, however the substrate with assembled filter particle array 208 is shown detached from detector array 301 for clarity. In practice, these two components would be in close contact. Particles 206A-D filter respective gas compounds 602A-D of gas mixture 601 consistent with the pre-selected gas interacting compounds in particles 206A-D. For example, particle 206A may filter, or conversely, permit the passage of only one class of vapors 602A (e.g., aliphatic alcohols). This class would be the only component not reaching the corresponding region 204A (FIG. 4) in the case of filtering, or conversely the only component reaching the underlying gas detector array 301. Another assembled set of particles 206D, for example, would filter or permit the passage of another class of vapors 602D (e.g., straight chain aliphatics), to region 204D and so on for other filter particle elements in filter particle array unit cell 205.

In practice, the level of separation and range of filter selectivity is defined by the type of molecular recognition element imparted on particles 206 and the arrangement of unit cell 205 which is repeated to form the pattern of filter particle array 208. A non-limiting example of a means for detecting gas species are solid state metal oxide thin films. Non-limiting examples of ionic detector arrays include electrochemical cells with ion specific electrodes. The method of the invention provides a new method for fabrication of ion-selective membranes that is presently not known in the art.

Figure 7:
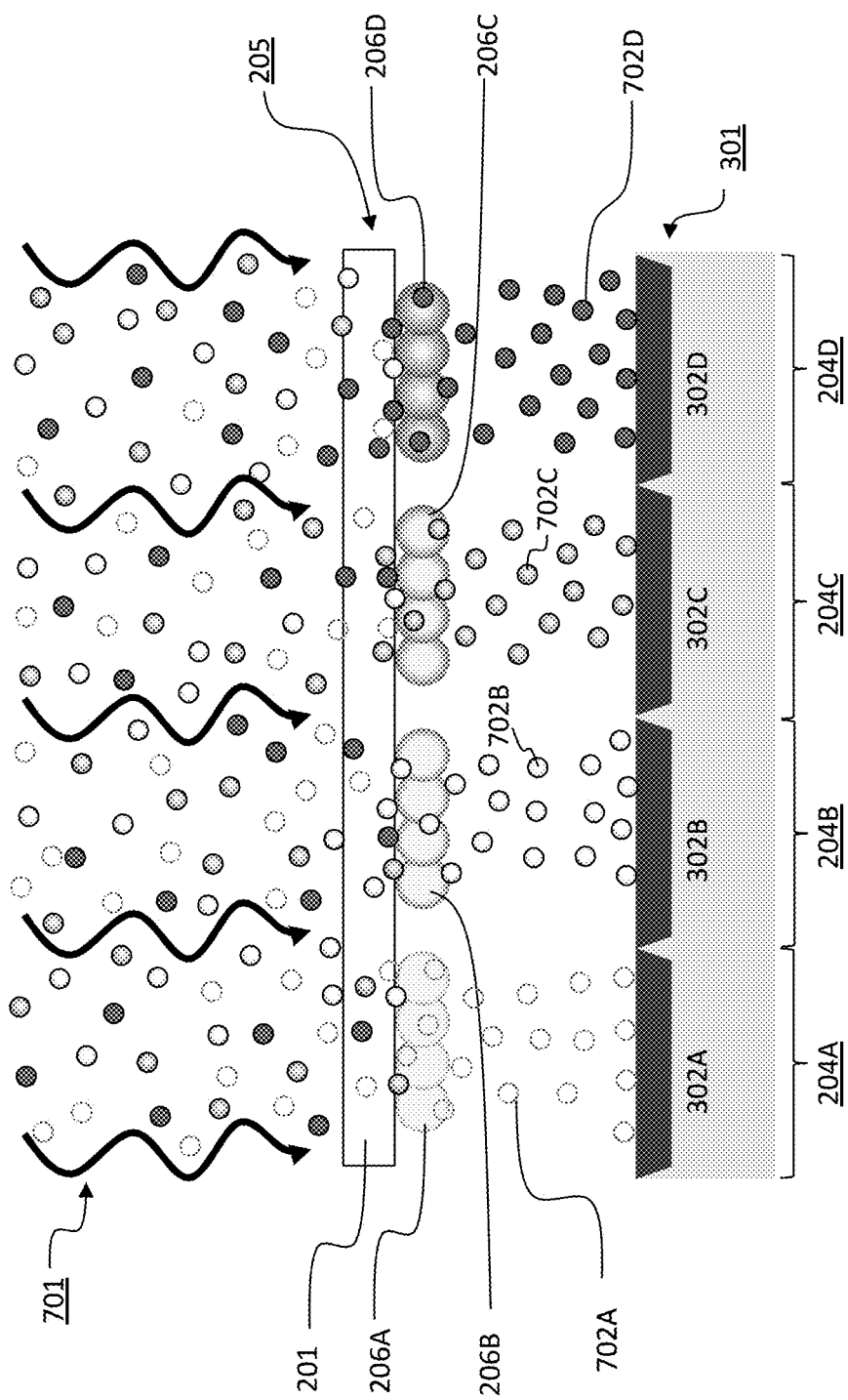
FIG. 7 is a cross-section view illustrating complex ionic solution filtering performed by a filter particle array having four different types of filter particles affixed at four addressable regions of the detector array. The filter particle array is detached from the substrate in the drawing to increase clarity.

Filter particle arrays that filter different ionic species from solution and methods for making and using ionic filter arrays are illustrated in FIG. 7. An ionic filter array functions differently than do gas filter arrays to remove one or more ionic species from solution 701 passing through the filter. Therefore, a filter array may have one or more array regions that removes or reduces specific ionic species from the mixture and/or that provides a means for certain ionic species to traverse the array region. Filtering methods of the invention can be broadly applied to any number of different chemical classes of ionic compounds including for example alkali and alkali earth metal cations (e.g., $H^+$, $Na^+$, $K^+$, $Mg^{2+}$, $Ca^{2+}$, etc.), organic cations, charged macromolecules, and small anionic compounds (e.g., $OH^-$, $NO_3^-$, $SO_3^{2-}$, etc.). Many atomic and molecular ionic species are known in the art, and complex solutions e.g., buffers are also numerous. Some non-limiting examples of applications of the invention include filters and filtering methods for blood chemistry or waste analysis, industrial process fluid analysis, water purity and toxicity analyses, and characterization of food products.

FIG. 7 shows a representation of an array having four addressable regions 204A-D of array unit cell 205 composed of four unique filter particle elements 206A-D. Filter particle complex 206A-D is shown attached to detector array 301. Solution 701 impinges on filter particle array unit cell 205. Particles 206A-D filter respective compounds 602A-D of solution 701 consistent with the pre-selected constituents in particles 206A-D. Filter particles 206A-D can be designed to interaction with any number of solutes, molecular or ionic, in solution 701. For example, particle 206A may selectivity bind only small positively charged ions 702A (e.g., alkali metals). This class would be the only component that does not reach the corresponding region 204A (FIG. 4) in the underlying ion detector array 301. Another assembled set of particles 206D, for example, may bind only small charged anions 702D (e.g., nitrates), to region 204D and so on for other filter particle elements in filter particle array unit cell 205. In practice, the degree of specificity and range of filter selectivity is defined by the type of chemistry imparted into particles 206 and the arrangement of unit cell 205, which is repeated to form the pattern of filter particle array 208. For example, an array can be employed to separate and detect broad categories of compounds such as cations vs. anions, or monovalent vs. multivalent e.g., $Na^+$ from $Ca^{2+}$, or small molecular compounds e.g., urea from ionic compounds. Conversely, very narrow classes of compounds such as separating $Na^+$ from $K^+$ in blood chemistry analysis, or any range there between may be made possible with the invention. Filtering of closely related species may be possible using more than one detection region in the array to create a specific signature for each compound i.e., a range of filter particle types may be included to collectively elucidate the concentration of one analyte relative to another. The ability to create large and complex arrays with varying degrees of selectivity in the fashion presented by this invention is not known in the art.

Figure 8:
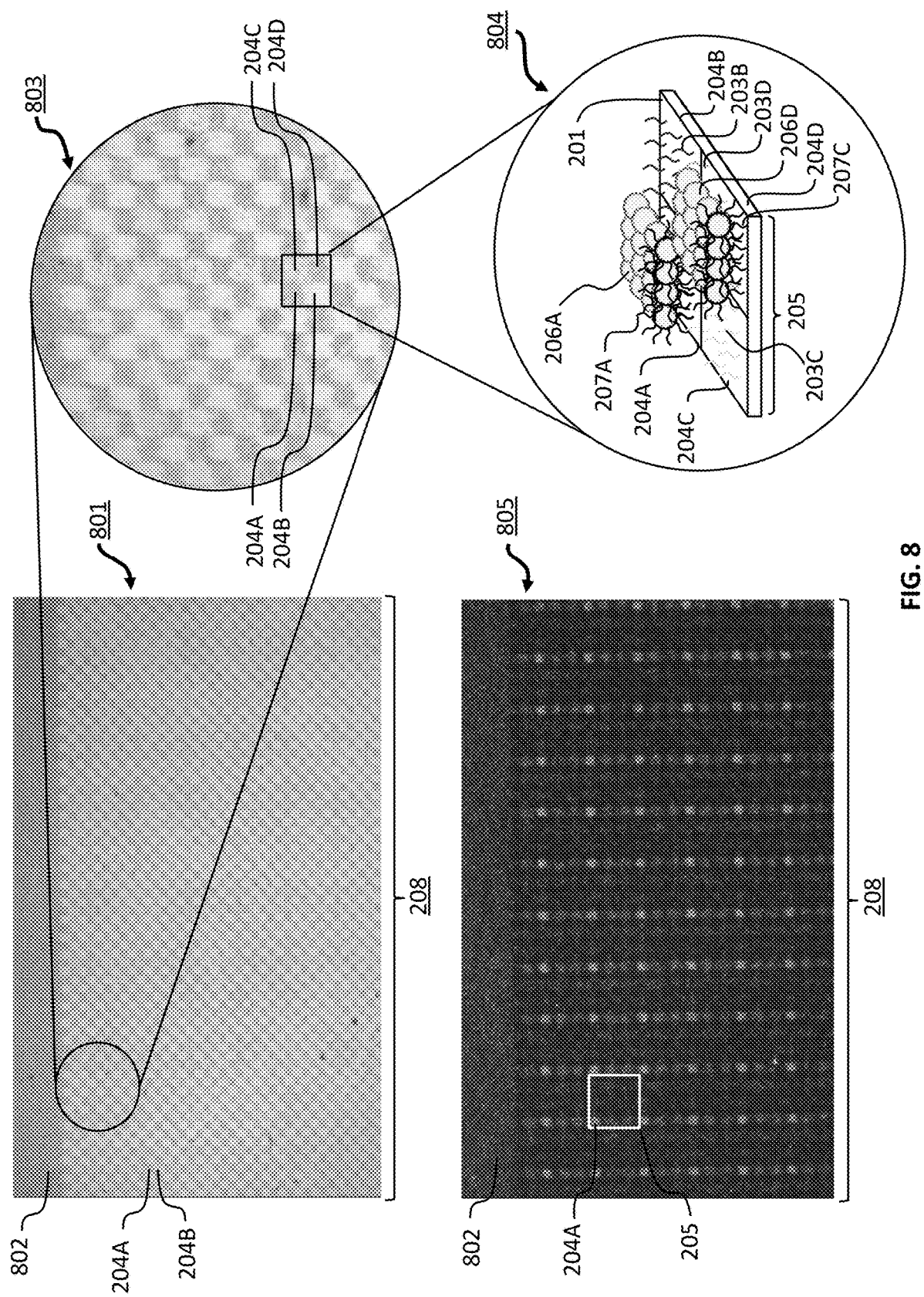
FIG. 8 is a photograph showing a specific example of nucleic acid-mediated assembly of polymer microsphere particles to specific regions of an addressable array.

FIG. 8 shows photographs of specific examples of polymeric microsphere particles that are localized at various regions in filter particle array 208. In this example, filter particle array 208 was assembled using a custom DNA microarray synthesized by Roche Nimblegen (www.nimblegen.com). Initially, microarray 801 was synthesized with anchored probe sequences 203A-D defined for specific regions 204A-D in the microarray. This method is one of many methods known in the art for microarray synthesis. Filter particle array 208 was formed on microarray 801 when filter particles 206 bound to specific regions 204A-N. In example 801, a 2×2 array is illustrated with two of the filter particle array regions, 204A and 204D having bound particles with different concentrations of fluorescent molecules. Fluorescence in this context is used purely for illustrative purposes in establishing selective assembly. In practice, visualization of different types of particles in the respective regions would not be necessary. A terminal edge of the array is also illustrated at the top of 701 where, in this specific example, full particle binding area 802 was encoded. Inset 803 shows unit cell 205 of filter particle array 208, composed of filter particle addressable regions 204A-D. The schematic diagram in inset 704 further illustrates unit cell 205, composed of addressable regions 204A-D. In the schematic, complementary sequences 207A-D, which were attached to polymer microsphere particles 206A-D, hybridized to anchored sequences 203A-D present in each array region 204A-D. Particle set 206A and 206D were localized in the example and regions 204B and 204C did not hybridize. For clarity, only the front row of particles 206 are depicted with complementary sequences 207. In practice, particles may be localized in any or all of the areas by combining individual particle sets 206A-N(N=any number of possible combinations) into a dispersion of particles with requisite encoding sequences 207A-N and exposing the particles to microarray 801 in a batch process.

In the example shown in FIG. 8, localized particles 206 appear as shaded areas, e.g., 204A, of the addressable regions of filter particle array 208. This is contrasted with the lighter region 204C where no localization occurs during exposure. Photograph 805 shows a different array consisting of a 3×3 unit cell 205 that is repeated to form filter particle array 208. In this example, particles 206A-I bound to addressable regions 204A-I consisting of polymer microspheres that were core-dyed with fluorescence dyes and nanoparticles. Photograph 805 shows brightly shaded regions where the core dying was extensive. Other regions where particles with less concentration of fluorophore were localized can also be seen in the photograph. Addressable regions 204, where no complementary particles are bound, appear dark in the photograph. In this example, the edge of microarray 801 is depicted with a portion of non-array area 802 in view. The ability to create large and complex arrays with multiple constituents in the fashion presented by this invention is not known in the art.

In one embodiment, a filter particle array is made to have a variety of patterns including 4 pixels in a 2×2 pattern. In other aspects of the invention, filter particle arrays are made to have 3×3 pixel patterns, 4×4 pixel patterns, 5×5 pixel patterns and/or up to N×N pixel patterns, where N is limited by the number of addressable spots present on the nucleic acid array used for making the filter particle array. In still other aspects of the invention, filter particle arrays comprise one or more different pixel patterns. Expanding the size of the pixel pattern from a typical 2×2 pattern to a 3×3, 4×4, 5×5, or higher pixel pattern enables expansion of the complexity of a filter particle array such that the filter particle array can be used to filter mixtures of higher complexity (i.e., mixtures having many components for removal). Such highly complex filter arrays may be useful for applications such as blood chemistry analysis or complex odorprint detection. Furthermore, array dimensions may not be symmetric, for example a repeated 2×3, 2×4, 2×5, 2×7, 2×10, 2×17, 2×51, 2×200, 2×1000, 3×4, 3×9, 3×300, 10×100 may be created. Furthermore, array dimensions need not be rectangular. Polygonal e.g., hexagonal or octagonal unit cells, or other irregularly shaped or elongated unit cell can be used to create filter particle arrays using the method of the invention. This can enable higher contrast between target species, accommodate broader class discrimination, and provide for detection that improves the separation in time between the components reaching the detector.

In an aspect of the invention, it is contemplated that the attachment of multiple types of filtering particles to the filter array occurs in a single step. In other aspects, the attachment of multiple types of filtering particles to the filter array occurs in multiple steps.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

What is claimed is:

1. A method of making a filter particle array for filtering molecules and ions in a mixture, the method comprising:
    (a) exposing a dispersion of polymer microsphere filter particles, derivatized so as to filter one or both of molecules and ions, to a detector array having a plurality of addressable regions, wherein the dispersion comprises a first set of selected derivatized polymer microsphere filter particles having binding moieties attached thereto, and wherein exposing causes binding of the binding moieties to complementary anchor biomolecules attached to a selected addressable region, thereby binding the first set of selected derivatized polymer microsphere filter particles to the selected addressable region; and
    (b) removing excess dispersion from the detector array.

2. The method of claim 1, wherein the detector array is a chemiresistive semiconductor detector array.

3. The method of claim 2, wherein the chemiresistive semiconductor detector array comprises an array of nanoimprinted metal oxide semiconductors.

4. The method of claim 1, further comprising providing the detector array.

5. The method of claim 1, further comprising:
    (c) exposing a second dispersion of the derivatized polymer microsphere filter particles to the detector array, wherein the second dispersion comprises a second set of the selected derivatized polymer microsphere filter particles, and wherein exposing causes binding of the binding moieties to the complementary anchor biomolecules attached to the selected addressable region, thereby binding the second set of selected derivatized polymer microsphere filter particles to the selected addressable region; and
    (d) removing excess second dispersion from the detector array.

6. The method of claim 1, wherein the dispersion further comprises a second set of selected derivatized polymer microsphere filter particles having binding moieties attached thereto that are complementary to anchor biomolecules attached to a second selected addressable region, and wherein exposing causes binding of the binding moieties attached to the second set of selected derivatized polymer microsphere filter particles to the complementary anchor biomolecules attached to the second selected addressable region, thereby binding the second set of selected derivatized polymer microsphere filter particles to the second selected addressable region.

7. The method of claim 6, wherein the filter particles in the first set of selected derivatized polymer microsphere filter particles are selected to be of a different type than the filter particles in the second set of selected derivatized polymer microsphere filter particles.

8. The method of claim 7, wherein the filter particles in the first set of selected derivatized polymer microsphere filter particles are selected to interact with a first species of molecule or ion and the filter particles in the second set of selected derivatized polymer microsphere filter particles are selected to interact with a second species of molecule or ion.

9. The method of claim 1, further comprising exposing a second dispersion of polymer microsphere filter particles, derivatized so as to filter the one or both of molecules and ions, to the detector array, wherein the derivatized polymer microsphere filter particles in the second dispersion comprise binding moieties attached thereto that are complementary to the binding moieties attached to the filter particles in the first set of selected derivatized polymer microsphere filter particles, and wherein exposing the second dispersion of derivatized polymer microsphere filter particles to the detector array causes binding of the binding moieties attached to the derivatized polymer microsphere filter particles in the second dispersion to the binding moieties attached to the filter particles in the first set of selected derivatized polymer microsphere filter particles bound to the selected addressable region.

10. The method of claim 1, further comprising applying a special function layer to the filter particle array after step (b).

11. The method of claim 10, wherein the special function layer comprises a macroscopic filter.

12. A method of filtering a mixture comprising one or both of molecules and ions, the method comprising:
    (a) causing the mixture to traverse a filter particle array attached to a detector array, wherein the filter particle array comprises a first set of polymer microsphere filter particles attached to a first selected addressable region of the detector array, and wherein the polymer microsphere filter particles are derivatized so as to filter at least one species of molecule or ion in the mixture.

13. The method of claim 12, wherein the derivatized polymer microsphere filter particles are selected to allow for passage to the detector array of one or more gas species present in the mixture.

14. The method of claim 12, wherein the derivatized polymer microsphere filter particles are selected to allow for passage to the detector array of one or more ionic species present in the mixture.

15. The method of claim 12, wherein the filter particle array comprises a plurality of sets of derivatized polymer microsphere filter particles, each set of derivatized polymer microsphere filter particles being attached to a distinct selected addressable region on the detector array.

16. The method of claim 15, wherein at least the first set of derivatized polymer microsphere filter particles is selected to filter a first selected species of molecule or ion and at least a second set of derivatized polymer microsphere filter particles is selected to filter a second selected species of molecule or ion.

17. A method of making a filter particle array for filtering molecules and ions in a mixture, the method comprising:
(a) exposing a dispersion of polymer microsphere filter particles derivatized so as to filter one or both of molecules and ions and having binding moieties attached thereto, to a substrate having a plurality of addressable regions, wherein exposing causes binding of the binding moieties to complementary anchor biomolecules attached to a selected addressable region, thereby binding a first the set of the derivatized polymer microsphere filter particles to the selected addressable region and forming a first filter particle array;
(b) removing excess dispersion from the substrate; and
(c) placing the substrate, having the first filter particle array bound thereto, in contact with a detector array, such that the addressable regions of the substrate are in registration with selected regions of the detector array, so as to transfer the first filter particle array to the detector array.

18. The method of claim 17, wherein the substrate is a transfer stamp or membrane.

19. The method of claim 18, wherein the detector array further comprises a linking layer.

20. The method of claim 18, further comprising applying a special function layer on the first filter particle array after transfer of the first filter particle array to the detector array.

21. The method of claim 17, further comprising,
(d) exposing a second dispersion of the derivatized polymer microsphere filter particles to the substrate, wherein exposing causes binding of the binding moieties to the complementary anchor biomolecules attached to the selected addressable region, thereby binding a second set of the derivatized polymer microsphere filter particles to the selected addressable region and forming a second filter particle array;
(e) removing-excess second dispersion from the substrate; and
(f) placing the second filter particle array in contact with the first filter particle array on the detector array, thereby binding the second filter particle array to the first filter particle array.

* * * * *